US012725624B2

(12) United States Patent
Kalgaonkar et al.

(10) Patent No.: US 12,725,624 B2
(45) Date of Patent: Sep. 1, 2026

(54) SYSTEMS AND METHODS FOR NOISE SUPPRESSION

(71) Applicant: Meta Platforms, Inc., Menlo Park, CA (US)

(72) Inventors: Kaustubh Kalgaonkar, Bellevue, WA (US); Kimishkumar Patel, Milpitas, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 183 days.

(21) Appl. No.: 18/521,982

(22) Filed: Nov. 28, 2023

(65) Prior Publication Data

US 2025/0174243 A1 May 29, 2025

(51) Int. Cl.
*G10L 21/0232* (2013.01)
*G10L 21/0208* (2013.01)
*G10L 25/30* (2013.01)

(52) U.S. Cl.
CPC .......... *G10L 21/0232* (2013.01); *G10L 25/30* (2013.01)

(58) Field of Classification Search
CPC .. G10L 21/0232; G10L 25/30; G10L 21/0208
See application file for complete search history.

(56) References Cited

U.S. PATENT DOCUMENTS 11,056,128 B2 * 7/2021 Lombard ............ G10L 21/0208
2002/0042712 A1 * 4/2002 Yajima ................ G10L 21/0208 704/260
2007/0292047 A1 * 12/2007 Jiao ......................... G06T 15/04 382/279
2011/0096942 A1 * 4/2011 Thyssen .............. G10L 21/0208 381/94.1
2011/0305351 A1 * 12/2011 Kimura .................. G11B 20/24 381/94.1
2011/0311095 A1 * 12/2011 Archer .................. G06F 16/783 375/240.26
2014/0350927 A1 * 11/2014 Yamabe .................. G10L 25/84 704/233

(Continued)

FOREIGN PATENT DOCUMENTS

CN 111684470 A * 9/2020 ............. G06N 3/048
CN 115641856 B * 3/2023 ............. G10L 21/02

(Continued)

*Primary Examiner* — Paras D Shah
*Assistant Examiner* — Mulugeta Tuji Dugda
(74) *Attorney, Agent, or Firm* — EVERSHEDS SUTHERLAND (US) LLP

(57) ABSTRACT

The disclosed computer-implemented method may include capturing, by a computing device, a media clip. The method may also include dividing, by the computing device, the media clip into a set of frames, wherein each frame may include an audio portion of the media clip of a predetermined length of time. Additionally, the method may include performing, by the computing device, a noise suppression process on each frame of the set of frames using a trained neural network model, wherein the trained neural network model is quantized to use input tensors. Finally, the method may include creating, by the computing device, a clean media clip based on the noise suppression process. Various other methods, systems, and computer-readable media are also disclosed.

20 Claims, 9 Drawing Sheets

(56) References Cited

U.S. PATENT DOCUMENTS

| | | | | |
|---|---|---|---|---|
| 2016/0037217 | A1* | 2/2016 | Harmon | H04N 21/4542 725/9 |
| 2019/0179635 | A1* | 6/2019 | Jiao | G06N 3/045 |
| 2020/0035219 | A1* | 1/2020 | Ward | G10L 15/16 |
| 2020/0066296 | A1* | 2/2020 | Sargsyan | G10L 21/0232 |
| 2020/0293858 | A1* | 9/2020 | Das | G06N 3/063 |
| 2021/0326750 | A1* | 10/2021 | Shah | G06N 3/063 |
| 2021/0406662 | A1* | 12/2021 | Timofejevs | G06F 30/39 |
| 2022/0004844 | A1* | 1/2022 | Haase | H03M 7/70 |
| 2022/0076077 | A1* | 3/2022 | Reddy | G06F 18/217 |
| 2022/0124433 | A1* | 4/2022 | Kupryjanow | G10L 25/30 |
| 2022/0309320 | A1* | 9/2022 | Trusov | G06N 3/0495 |
| 2023/0068381 | A1* | 3/2023 | Gollanapalli | G06N 3/045 |
| 2023/0186050 | A1* | 6/2023 | Das | G06N 3/0495 706/27 |
| 2023/0230610 | A1* | 7/2023 | Seetharaman | G06F 3/165 704/202 |
| 2023/0254650 | A1* | 8/2023 | Lovchinsky | G10L 21/0316 |
| 2024/0029750 | A1* | 1/2024 | Goh | G10L 21/0216 |
| 2024/0071064 | A1* | 2/2024 | Chung | G06V 20/58 |
| 2024/0412751 | A1* | 12/2024 | Tanaka | G10L 21/0232 |

FOREIGN PATENT DOCUMENTS

| | | | | | |
|---|---|---|---|---|---|
| GB | 2515362 | A | * | 12/2014 | H04N 19/65 |
| KR | 100863122 | B1 | * | 10/2008 | G06F 3/0362 |
| WO | WO-2017094121 | A1 | * | 6/2017 | G10L 25/12 |
| WO | WO-2022159247 | A1 | * | 7/2022 | G10L 21/02 |

* cited by examiner

SYSTEMS AND METHODS FOR NOISE SUPPRESSION

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
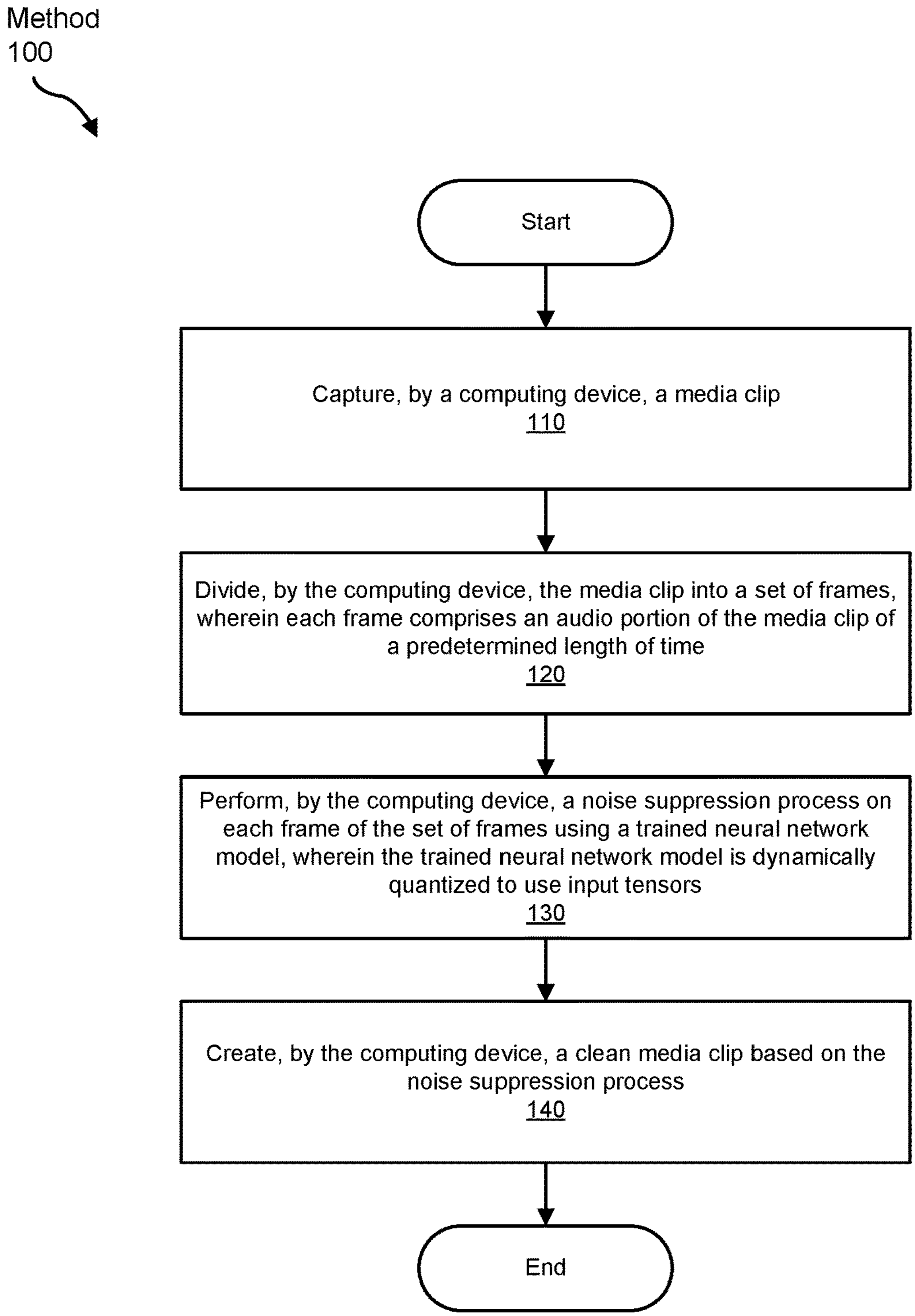
FIG. 1 is a flow diagram of an exemplary method for noise suppression.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Audio data can include unwanted signals that interfere with the quality of wanted signals. For example, background noise in a call may obstruct the voice of a speaker, making it difficult to discern words spoken during the call. To reduce the effect of unwanted noise, various noise suppression techniques may attempt to enhance incoming signals or suppress unwanted signals. In some cases, methods for noise suppression may estimate noise signals and develop filters to suppress the noise. However, it may be difficult to accurately and efficiently estimate noise, particularly for real-time audio streaming where mouth-to-ear latency is an issue.

Some noise suppression methods may attempt to mask some signals and increase the gain on other signals on a magnitude spectrum. Other methods may focus on post-processing techniques to hide residual noise or to exploit traits of human perception to enhance the audio. However, complex techniques may also increase the time and processing power required to perform the techniques, thereby increasing the latency or impacting the battery life of devices. In some embodiments, models using deep learning methods may have both algorithm latency caused by complex models and operating latency caused by processor use. For example, in some types of models, frames of audio may be convolved and concatenated with previous and/or subsequent frames for processing, which may be a time-consuming and processor-intensive process. In a live streaming scenario, such as during a call between multiple users, latency in processing audio may be especially problematic. On the other hand, models that attempt to reduce latency may face tradeoffs with the complexity of the model, which may reduce the quality of the noise suppression. For example, smaller models with lower complexity may be designed to quickly process audio, but this may compromise the quality of audio and may inaccurately reduce wanted signals or may incompletely suppress unwanted background noise. Thus, better methods of performing noise suppression are needed to minimize latency while improving accuracy.

The present disclosure is generally directed to systems and methods for noise suppression. As will be explained in greater detail below, embodiments of the present disclosure may, by training and optimizing a neural network model, create a filter to quickly process noisy audio and produce a cleaned audio clip. For example, by training a model to recognize spoken word and remove interference, the disclosed systems and methods may process speech for an audio application, such as a communications application, or for other machine learning applications like automatic speed recognition software. By applying machine learning to pairs of noisy audio clips and associated clean audio clips, the systems and methods described herein may first train a neural network model to address the quality loss in audio signals. The disclosed systems and methods may then quickly process audio, such as by applying a filter derived from neural networks to live streaming audio, to produce a cleaned version of the original audio using the trained model. Additionally, the trained model may include layers of encoding, layers of decoding, and a feature processor to process the audio and transform it into a cleaned and filtered version of the audio.

The disclosed systems and methods may also optimize the model to reduce latency and to reduce required processing power. The disclosed systems and methods may divide an audio clip or a captured live-streamed media clip into frames of time to process one frame at a time. For some models, concatenating separate frames of the audio, with each frame truncated to a short period of time, may help to determine a word spoken over a period of several frames by deriving context from neighboring frames to predict the content of a single frame. However, the process of concatenating data from multiple frames may be costly in terms of time and processing power. Rather than combing input from multiple frames into a single input tensor using concatenation, the systems and methods described herein may use indirection buffers to point to separate tensor locations of input from multiple frames to avoid the costly process of concatenation. The disclosed systems and methods may then apply the optimized model on each frame to encode, process, and decode the frame to identify a signal of interest, such as speech, and potential noisy signals. The systems and methods described herein may also perform pre-processing and post-processing steps to create a final clean audio clip combining the divided frames. Furthermore, the disclosed systems and methods may iteratively improve the trained model by retraining it using the captured or live-streaming audio and the processed clean audio.

In addition, the systems and methods described herein may improve the functioning of a computing device by improving the noise suppression model to increase the speed of audio processing and reduce the utilization of processing power. These systems and methods may also improve the fields of audio processing and communications by quickly and accurately reducing noise and artifacts from both recorded audio and live audio using a neural network model. Thus, the disclosed systems and methods may improve over typical methods of noise suppression.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIG. 1, detailed descriptions of computer-implemented methods for noise suppression. Detailed descriptions of a corresponding exemplary system will be provided in connection with FIG. 2. Detailed descriptions of training an exemplary machine learning method to create an exemplary trained neural network model will be provided in connection with FIG. 3, and detailed descriptions of the exemplary trained neural network model with exemplary encoder layers, exemplary feature processor layers, and exemplary decoder layers will be provided in connection with FIG. 4. In addition, detailed descriptions of using exemplary indirection buffers to point to exemplary input tensor locations during encoding and detailed descriptions of an exemplary encoding process will be provided in connection with FIGS. 5A, 5B, and 6. Detailed descriptions of an exemplary decoding process will also be provided in connection with FIG. 7. Furthermore, detailed descriptions of an exemplary noise suppression process using an exemplary trained neural network model to create an exemplary clean media clip will be provided in connection with FIG. 8. Finally, detailed descriptions of iteratively improving the exemplary trained neural network model through retraining will be provided in connection with FIG. 9.

FIG. 1 is a flow diagram of an exemplary computer-implemented method 100 for noise suppression. The steps shown in FIG. 1 may be performed by any suitable computer-executable code and/or computing system, including system 200 illustrated in FIG. 2. In one example, each of the steps shown in FIG. 1 may represent an algorithm whose structure includes and/or is represented by multiple sub-steps, examples of which will be provided in greater detail below.

Figure 2:
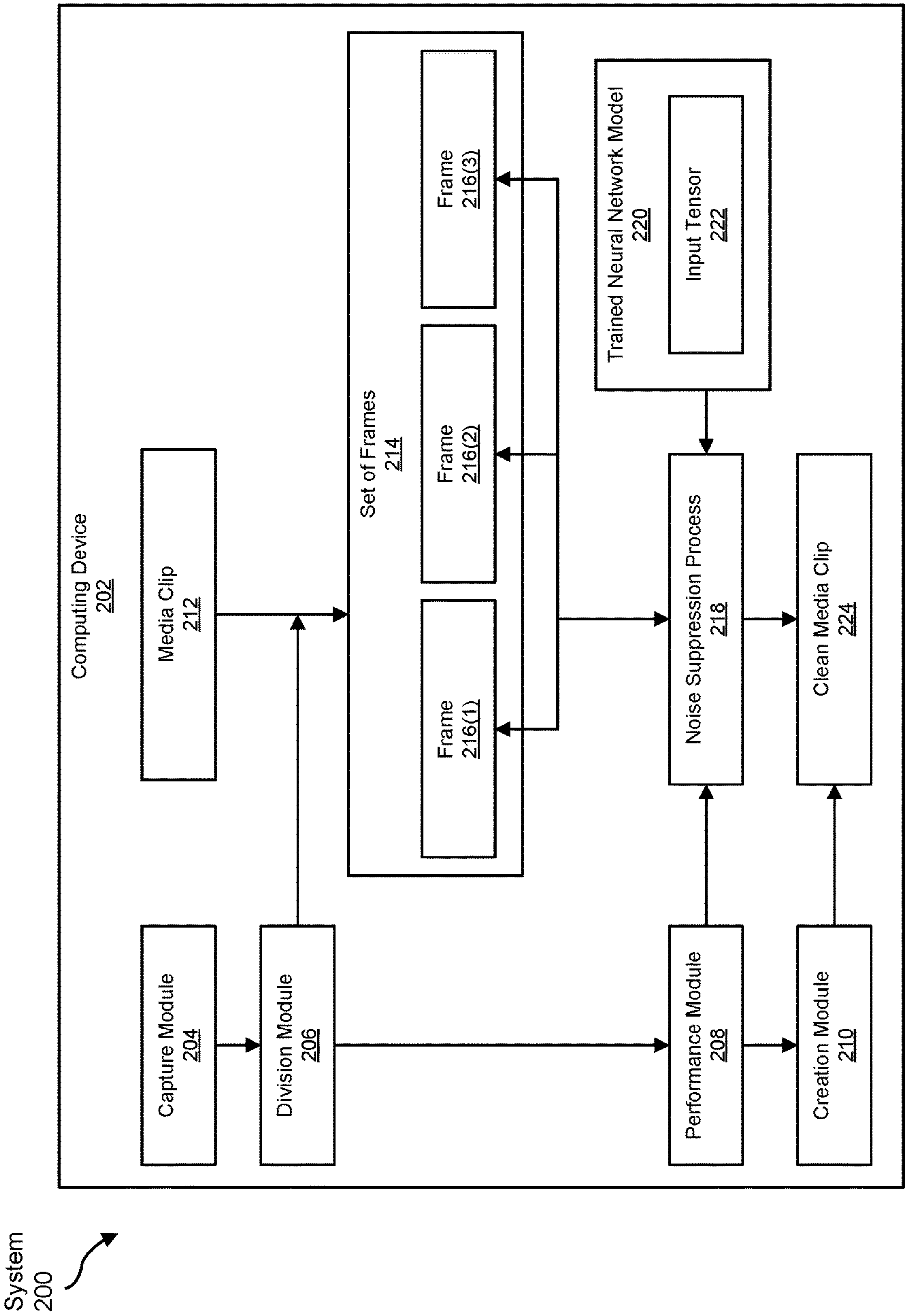
FIG. 2 is a block diagram of an exemplary system for noise suppression.

As illustrated in FIG. 1, at step 110 one or more of the systems described herein may capture, by a computing device, a media clip. For example, FIG. 2 is a block diagram of an exemplary system 200 for noise suppression. As illustrated in FIG. 2, a capture module 204 may, as part of a computing device 202, capture a media clip 212.

The systems described herein may perform step 110 in a variety of ways. In one example, media clip 212 may include an audio clip, a video clip, and/or a multimedia clip. In some examples, media clip 212 may represent a recorded media clip, and capture module 204 may extract audio data from media clip 212. In other examples, media clip 212 may represent live-streaming media, such as a teleconferencing call, and capture module 204 may capture media clip 212 in real time, such as by continuously capturing short segments of the audio. In these examples, performing noise suppression on media clip 212 may require reduced latency to avoid delays in communication between users. For example, a user of computing device 202 may be holding a video conference with a remote user of a different computing device. In this example, a delay of one second caused by audio processing may impact a conversation between the users, which may impact the experience of using the video conferencing software. Thus, capture module 204 may capture very short bursts of audio, such as clips of 10 milliseconds long at a time, to quickly process the audio before moving to the next segment of audio as it is received. In these examples, media clip 212 may represent audio to be sent from computing device 202 to a different computing device or audio received by computing device 202 from the different computing device. Additionally, in some examples, computing device 202 may act as an intermediary between client devices to process media clip 212 before forwarding cleaned audio to a client device.

In one example, computing device 202 of FIG. 2 may generally represent any type or form of computing device or server that may be programmed with the modules of FIG. 2 and/or may store all or a portion of the data described herein. For example, computing device 202 may represent a server that is capable of storing and/or transmitting media files, such as media clip 212, and may be capable of reading computer-executable instructions. As another example, computing device 202 may represent a client device that is capable of receiving and playing media clip 212. Examples of computing devices may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device. Additional examples of computing devices may include, without limitation, application servers and database servers configured to provide various database services and/or run certain software applications, such as media storage and streaming services.

Furthermore, in some embodiments, computing device 202 may be in communication with a server or other computing devices and systems via a wireless or wired network. In some examples, the term "network" may refer to any medium or architecture capable of facilitating communication or data transfer. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like.

Returning to FIG. 1, at step 120, one or more of the systems described herein may divide, by the computing device, the media clip into a set of frames, wherein each frame may include an audio portion of the media clip of a predetermined length of time. For example, a division module 206 may, as part of computing device 202 in FIG. 2, divide media clip 212 into a set of frames 214, wherein each of frames 216(1)-(3) may include an audio portion of media clip 212 of a predetermined length of time.

The systems described herein may perform step 120 in a variety of ways. As discussed above, in some examples, division module 206 may divide media clip 212 into 10 ms frames of audio. In other examples, division module 206 may divide media clip 212 based on an optimal length of time for processing audio to suppress noise. For example, the disclosed systems and methods may determine a length of time to process the audio and output a clean version of the audio without significantly disrupting a live streaming session for a user. In other examples, the disclosed systems and methods may determine the predetermined length of time based on the amount of time taken to perform the disclosed noise suppression methods. For example, for a 10 ms frame of audio, the disclosed systems and methods may perform noise suppression within 3 ms, thereby performing the process quickly enough to avoid delays longer than the 10 ms length of time of the frame. For processing delays longer than 10 ms, a system may need to discard the frame of audio during live streaming to avoid accrued delays. In other words, the processing time for a frame may ideally be shorter than the predetermined length of time such that a frame is processed while a next frame is captured.

Returning to FIG. 1, at step 130, one or more of the systems described herein may perform, by the computing device, a noise suppression process on each frame of the set of frames using a trained neural network model, wherein the trained neural network model is quantized to use input tensors. For example, a performance module 208 may, as part of computing device 202 in FIG. 2, perform a noise suppression process 218 on each frame of set of frames 214 using a trained neural network model 220, wherein trained neural network model 220 is quantized to use input tensors, such as an input tensor 222.

The systems described herein may perform step 130 in a variety of ways. In some embodiments, trained neural network model 220 may be trained using a machine learning method on pairs of clean audio samples and noisy audio samples to create a filter or a mask for noisy audio. In other embodiments, trained neural network model 220 may be trained to produce clean audio directly from noisy audio, such as by transforming noisy audio clips into clean audio clips. In some examples, the terms "neural network" and "neural network model" may refer to a machine learning model that can learn from labeled or unlabeled data using multiple processing layers to estimate functions. For example, a deep belief neural network may use unsupervised training of input data to detect features within the data. Other examples of neural networks may include, without limitation, linear neural networks, convolutional neural networks, recurrent neural networks, memory networks, encoder-decoder networks, and/or any other suitable form of artificial neural network used for learning from data. In some examples, the term "machine learning" may refer to a computational algorithm that may learn from data in order to make predictions. Examples of machine learning may include, without limitation, support vector machines, neural networks, clustering, decision trees, regression analysis, classification, variations or combinations of one or more of the same, and/or any other suitable supervised, semi-supervised, or unsupervised methods. In some examples, the terms "filter" and "mask" may refer to a process of transforming data by excluding or enhancing specific portions or types of data, such as by removing frequencies determined to be noise from audio data.

In some examples, the term "quantization" may refer to a process of simplifying data to increase the processing speed of the data. For example, data that is stored in 32 bits may be quantized to be stored in 4 bits, thereby reducing the amount of time to process the smaller amount of data. In some examples, the term "tensor" may refer to a mathematical construct or data format capable of a high dimensionality that describes relationships between sets of objects in a vector space. For example, scalar data may be represented by a single number or dimension, and vector data may be represented by a list of numbers. In this example, a matrix may be represented by a higher dimension of numbers, such as an array with rows and columns. In this example, tensor data may encompass scalar data, vector data, and matrices, and tensor data may include additional dimensions, such as a matrix of matrices, as well as the relationship between these dimensions. Thus, a single tensor datapoint may include a more complex representation of data that may otherwise require multiple datapoints of other types of data. By training trained neural network model 220 to use input tensors, the disclosed systems and methods may enable trained neural network model 220 to process fewer individual inputs. By quantizing trained neural network model 220, the disclosed systems and methods may also simplify the complex input data represented by the input tensors. Thus, the disclosed systems and methods may create a more compact model that runs faster than the same model without quantization of the input audio data. In some examples, quantization may be dynamically performed, statically quantized, and/or any other variations of quantization that improves speed.

In the above embodiments, one or more machine learning methods may train trained neural network model 220 on pairs of clean audio samples and noisy audio samples, with each noisy audio sample representing a version of the corresponding clean audio sample that includes more unwanted noise. In some examples, the noisy audio samples may include one or more noisy audio clips, and the corresponding clean audio clips may represent the noisy audio clips pre-processed for noise suppression. For example, noisy audio samples may be collected and processed using trained neural network model 220 or a pre-existing filter to create noisy audio samples. The disclosed systems and methods may then train or retrain trained neural network model 220 using the corresponding pairs of clean and noisy audio samples. In other examples, the noisy audio samples may include clean audio clips transformed into noisy audio clips using data augmentation. In these examples, clean audio samples may represent target clean audio with intentionally introduced noise that trained neural network model 220 is trained to remove. For example, an audio clip of a user speaking may be augmented by distorting the speech and introducing additional background noise, such as wind sound or other voices. In some examples, the same clean audio sample or multiple clean audio samples may be distorted or augmented multiple ways to create multiple pairs of clean and noisy audio samples, thereby training trained neural network model 220 to recognize different types of noise. For example, the disclosed systems and methods may perform data augmentation on-the-fly to simulate multiple speakers, simulate multiple sources of sound such as multiple microphones, insert silence, create gain variation, add reverberation, and/or any other form of noise simulation. Additionally, the training data composed of clean audio samples and noisy audio samples may be transformed intentionally and/or randomly.

In one embodiment, trained neural network model 220 may be trained by comparing the noisy audio samples to the clean audio samples to determine a set of losses. In this embodiment, a loss may represent the difference between a noisy audio sample and the corresponding clean audio sample, such as by comparing a difference in volume at different frequencies. In some examples, the set of losses may be used to create the filter to process noisy audio and remove potential noise as detected by trained neural network model 220. In some embodiments, trained neural network model 220 may be trained by jointly using the clean audio samples and the noisy audio samples with specially designed losses.

Figure 3:
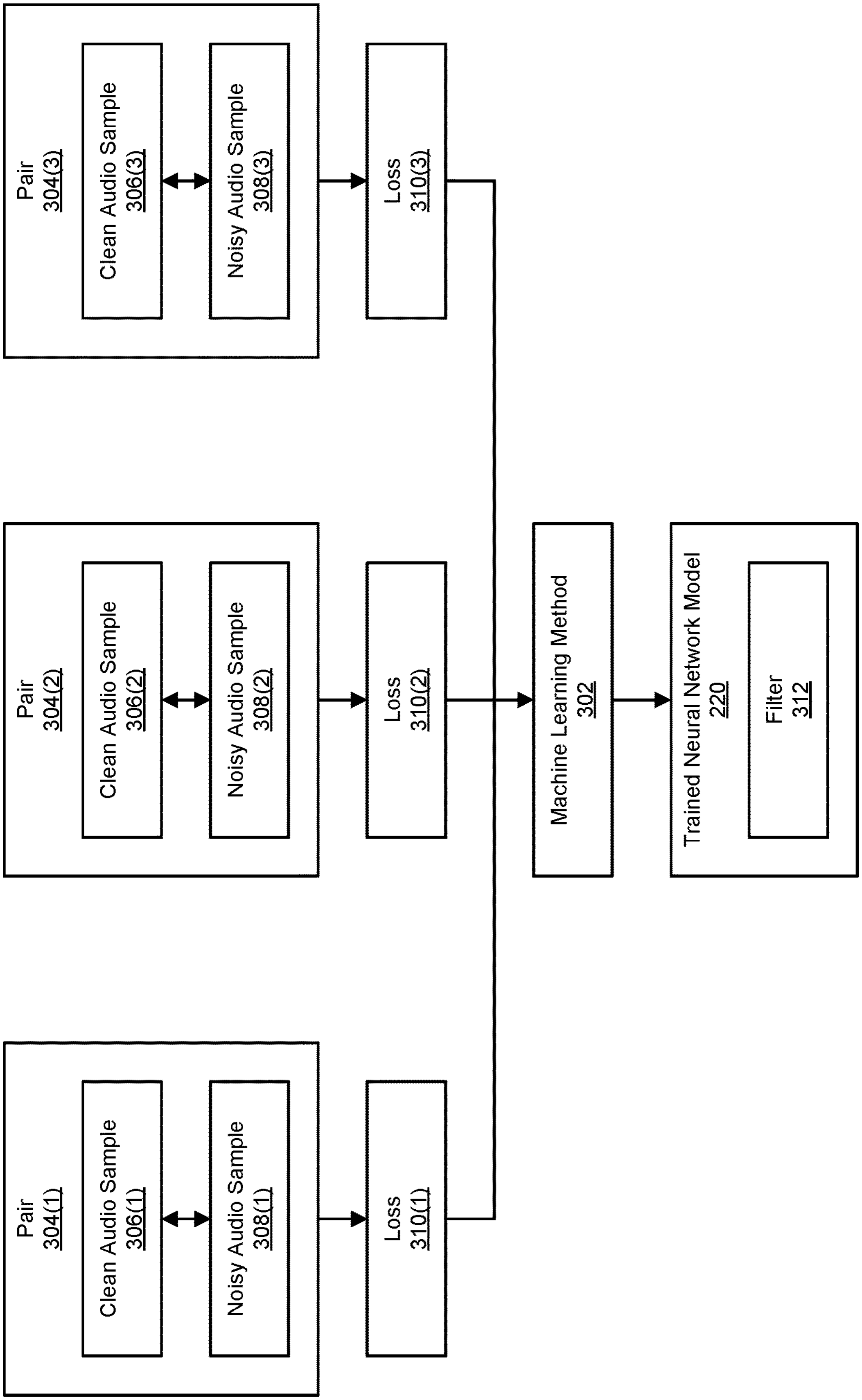
FIG. 3 is a block diagram of an exemplary training of an exemplary machine learning method to create an exemplary trained neural network model.

FIG. 3 illustrates an exemplary training of a machine learning method 302 to create trained neural network model 220. As shown in the example of FIG. 3, pairs 304(1)-(3) include clean audio samples 306(1)-(3) and noisy audio samples 308(1)-(3), with each clean audio sample corresponding to a paired noisy audio sample. Based on pairs 304(1)-(3), the disclosed systems and methods may determine losses 310(1)-(3). In this example, machine learning method 302 may be trained using pairs 304(1)-(3) and losses 310(1)-(3) to create a filter 312 for trained neural network model 220 to perform noise suppression process 218. In some examples, filter 312 may represent a separate filter used during pre-processing of media clip 212 or during post-processing after trained neural network model 220 performs noise suppression process 218. For example, filter 312 may represent a low pass filter that initially amplifies or reduces some signals or frequencies of media clip 212.

In some examples, trained neural network model 220 may include one or more of a set of encoder layers, a feature processor, and/or a set of decoder layers. In some examples, the term "encoder" may refer to a machine learning mechanism that processes data to extract features that may be used to classify or label data for further analysis and that transforms variable data into a state with a fixed shape. In some examples, the term "decoder" may refer to a machine learning mechanism that corresponds with an encoder to map the fixed shape data to variable data. For example, a decoder may transform variable audio data into a feature tensor, and a decoder may take the feature tensor to output transformed audio data. In some examples, the term "feature processor" may refer to a form of neural network capable of processing features of data, such as features extracted by an encoder, to learn from the data. Examples of feature processors may include, without limitation, gated recurrent units (GRUs), long short-term memory (LSTM) neural networks, temporal convolutional networks (TCNs), latency-controlled bidirectional LSTM neural networks, split-shuffled LSTM neural networks, and/or any other form of neural networks capable of learning from data, particularly sequential data.

Figure 4:
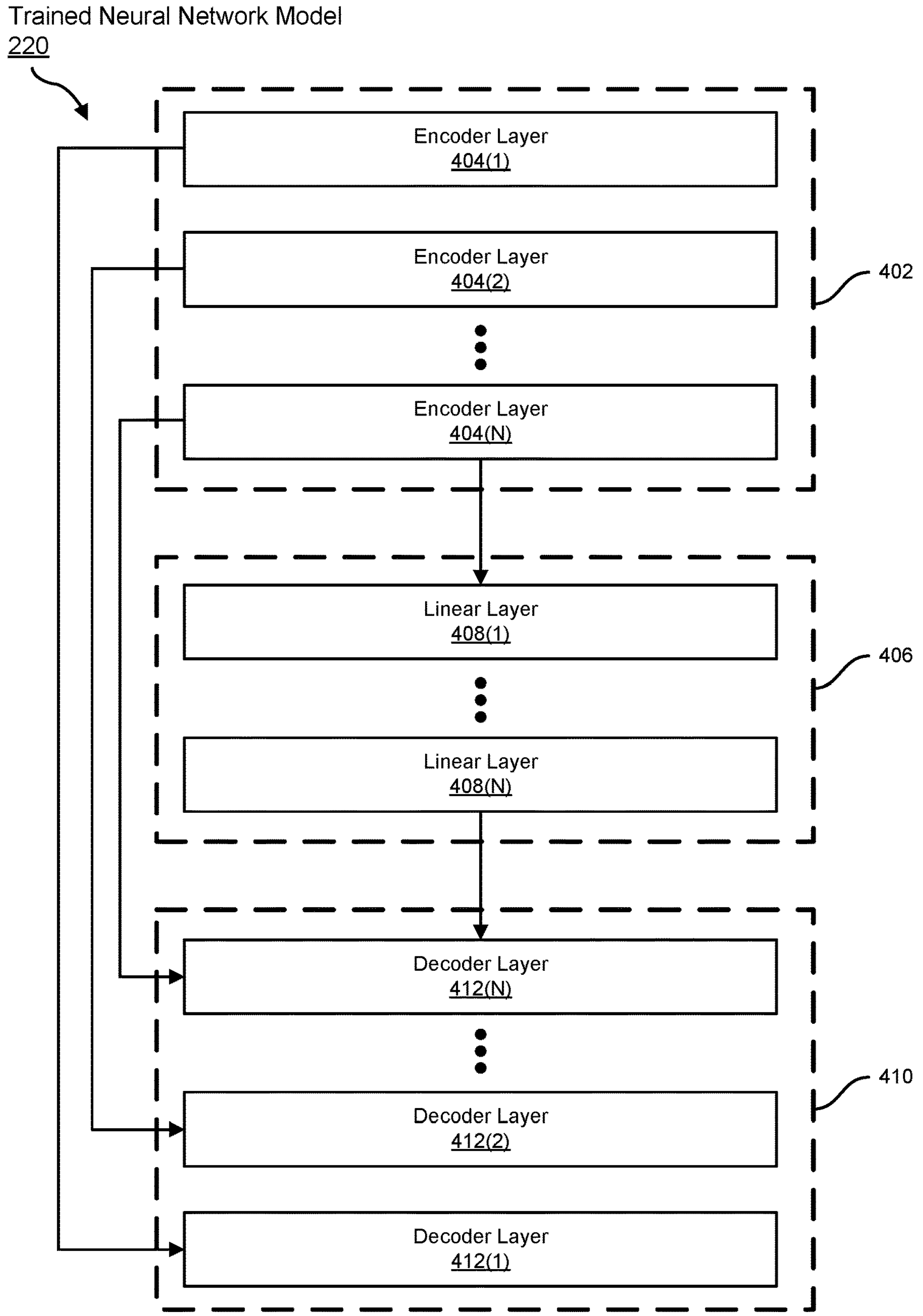
FIG. 4 is a block diagram of an exemplary trained neural network model with exemplary encoder layers, exemplary feature processor layers, and exemplary decoder layers.

FIG. 4 illustrates trained neural network model 220 with a set of encoder layers 402, a feature processor 406, and a set of decoder layers 410. As shown in FIG. 4, each of decoder layers 412(1)-(N) may correspond to one of encoder layers 404(1)-(N). Additionally, in this example, feature processor 406 may include linear layers 408(1)-(N). In some examples, linear layers 408(1)-(N) may represent recurrent layers. In some examples, the term "linear layer" may refer to a neural network layer that performs linear transformation of data. In other examples, feature processor 406 may include other types of layers, including additional encoder layers, additional decoder layers, and/or other types of neural networks or neural network layers. As shown in FIG. 4, data may be passed from set of encoder layers 402 to feature processor 406 to set of decoder layers 410, and set of decoder layers 410 may also use output states of data from corresponding set of encoder layers 402 as input. In some examples, trained neural network model 220 may be configured to receive audio input and format audio output as wave-in and wave-out, spectrum-in and spectrum-out, spectrum-in and mask-out, feature-in and magnitude-mask-out, feature-in and complex-mask-out, complex-feature-in and complex-feature-out, and/or any other suitable formats for audio inputs and outputs.

Figure 5A:
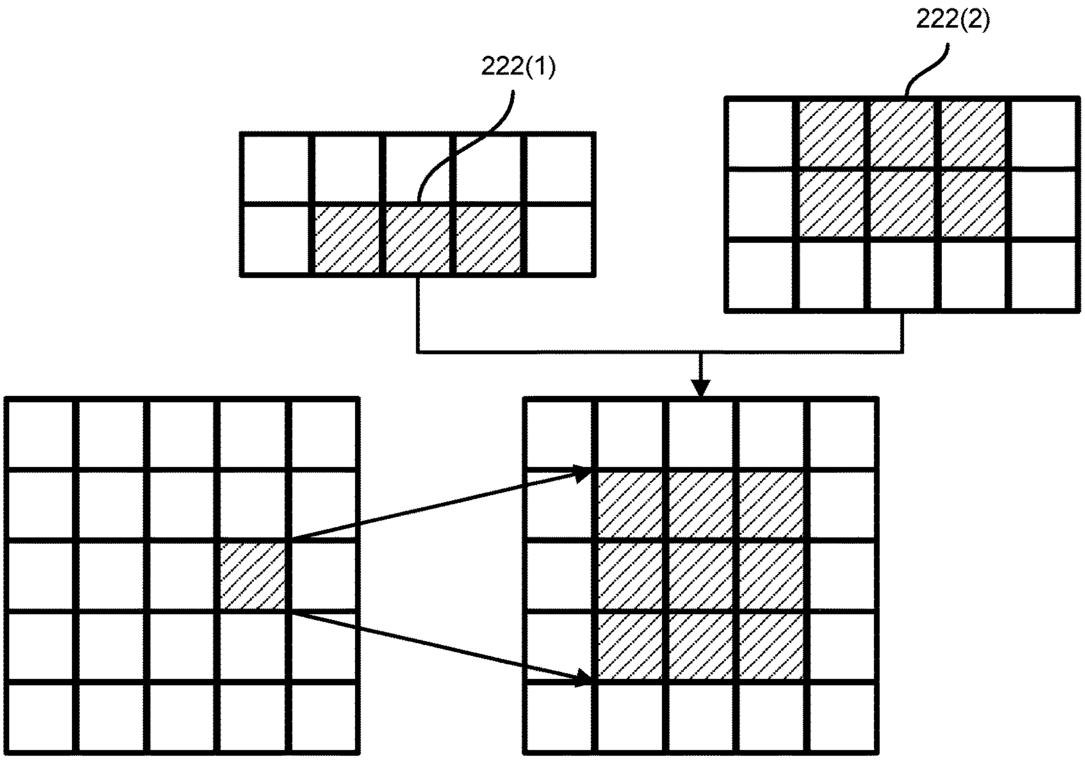
FIGS. 5A and 5B are illustrations of using exemplary indirection buffers to point to exemplary input tensor locations during encoding.
Figure 5B:
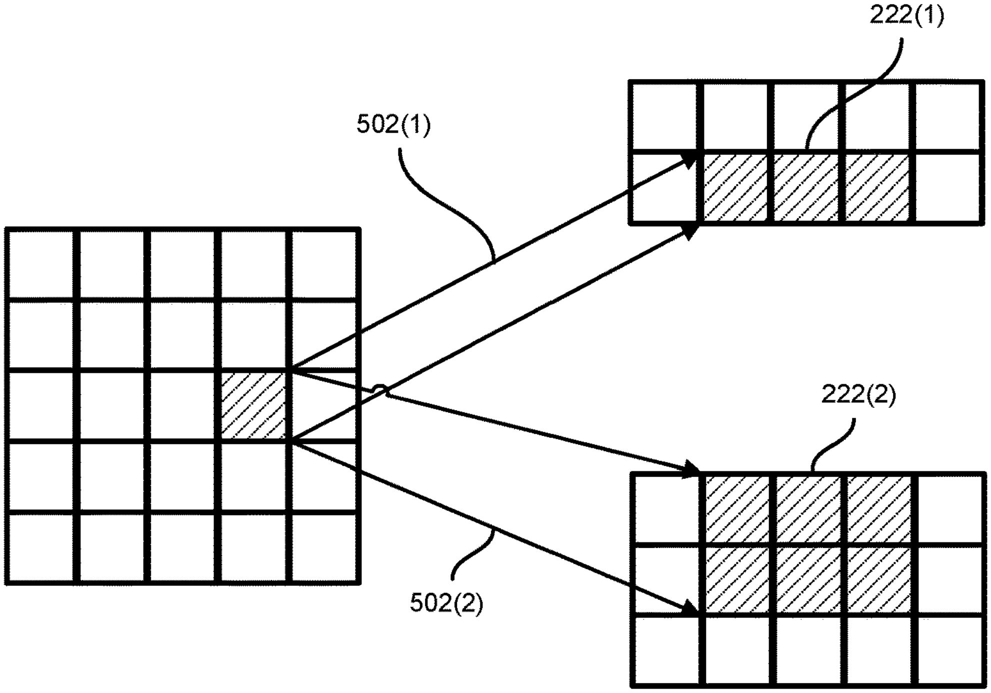

In some embodiments, trained neural network model 220 may be quantized and sped up by using indirection buffers to point to separate input tensor locations during encoding. In some examples, the term "indirection buffer" may refer to a buffer of pointers that indicate the location of data, such that an indirection buffer may be passed as data in place of the original data. For example, FIG. 5A illustrates input tensors 222(1) and 222(2) saved in separate memory locations. In this example, input tensor 222(1) may represent contextual data from a previous encoding layer, and input tensor 222(2) may represent an input of a current encoding layer. In the example of FIG. 5A, input tensors 222(1) and 222(2) may be concatenated to create a combined data input for the current encoder layer to more accurately extract features from a frame using previous contextual information. In contrast, FIG. 5B illustrates a process to avoid a costly concatenation step and keep input tensors 222(1) and 222(2) separate. In the example of FIG. 5B, indirection buffers 502(1) and 502(2) point to the locations of input tensors 222(1) and 222(2), respectively, to process input data without materializing concatenation. As described above, trained neural network model 220 may use input tensors 222(1) and 222(2) to process audio data, and indirection buffers 502(1) and 502(2) may simplify the complex input data represented by input tensors 222(1) and 222(2).

Figure 6:
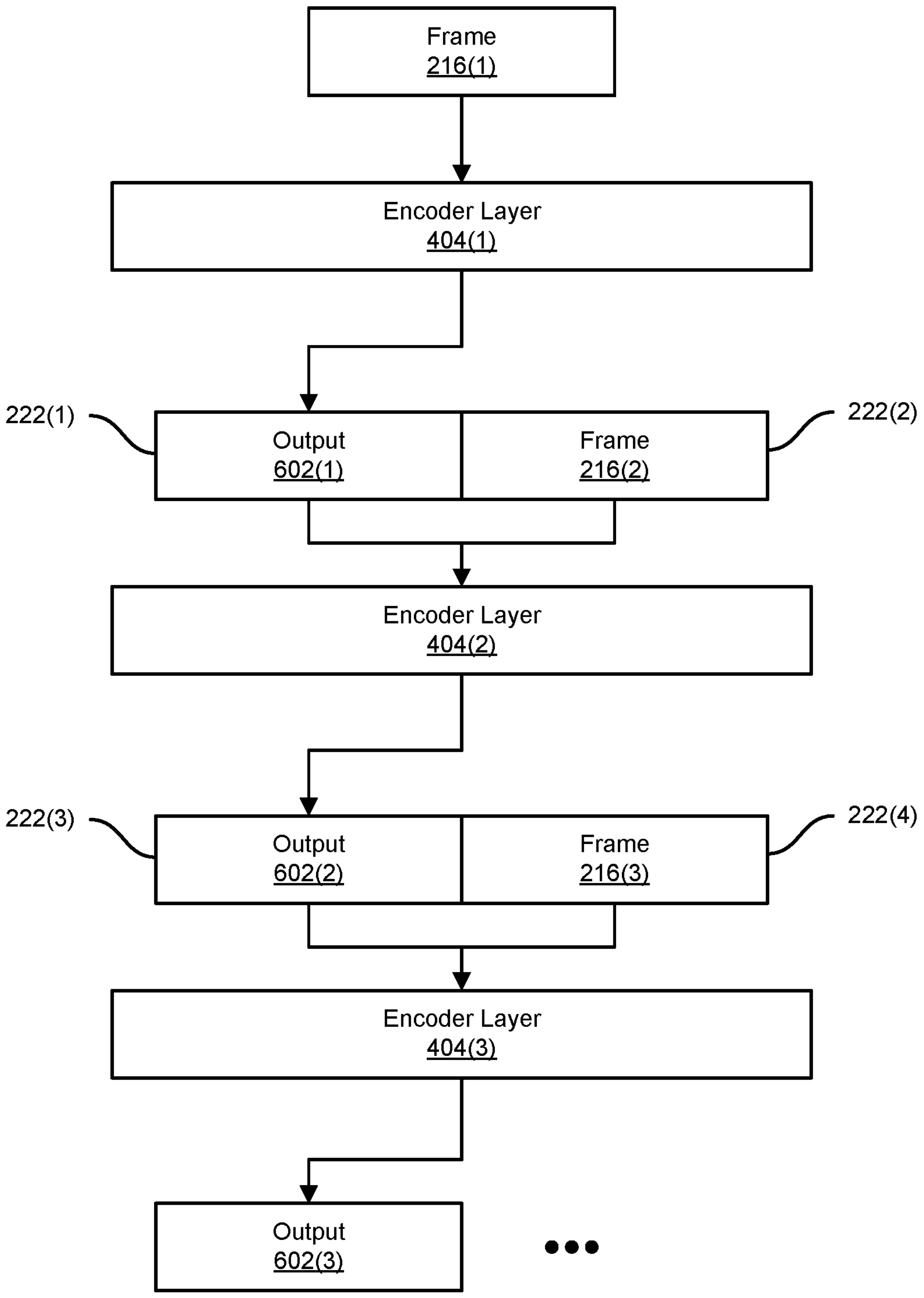
FIG. 6 is a block diagram of an exemplary encoding process.
Figure 7:
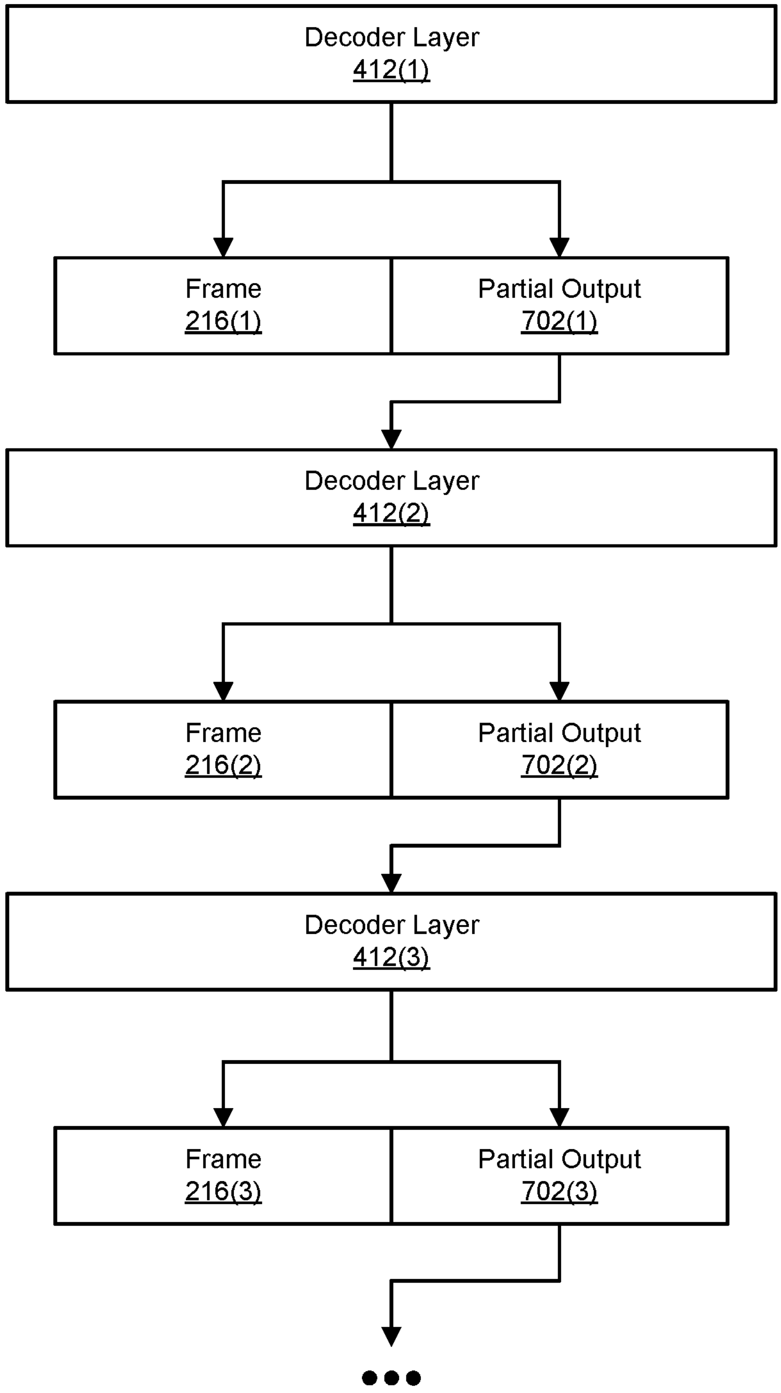
FIG. 7 is a block diagram of an exemplary decoding process.

In the above embodiments, an encoder layer in set of encoder layers 402 may save a state of a frame as a first input tensor of the frame, may save an output of a previous encoder layer for a previous frame occurring chronologically before the frame as a second input tensor of the frame, may use the indirection buffers to identify a location of the first input tensor and a location of the second input tensor, and may output an encoding of the frame using the first input tensor and the second input tensor. For example, an encoder may use depthwise separable convolutions or a single convolutional neural network block. As shown in FIG. 6, encoder layer 404(1) may first process audio data from frame 216(1) and create an output 602(1). In this example, an encoder layer 404(2) may then use audio data from frame 216(2) as well as output 602(1) containing contextual information from frame 216(1) to create an output 602(2). For example, frame 216(1) may contain audio immediately occurring before frame 216(2) that may be useful to extract a spoken word that lasts from frame 216(1) to frame 216(2). In other words, each encoder layer may maintain a current state as well as saving a previously computed output. Similarly, an encoder layer 404(3) may use output 602(2) from encoder layer 404(2) and frame 216(2) to create an output 602(3), and so on. In the example of FIG. 6, output 602(1) and a state of frame 216(2) may represent input tensors 222(1) and 222(2) processed by encoder layer 404(2), and output 602(2) and a state of frame 216(3) may represent input tensors 222(3) and 222(4) processed by encoder layer 404(3). Additionally, as in the example of FIG. 5, rather than passing output 602(1) and frame 216(2) from encoder layer 404(1) to encoder layer 404(2), the encoding process may instead pass indirection buffers, such as indirection buffers 502(1) and 502(2), pointing to locations of input tensors 222(1) and 222(2). Similarly, other indirections buffers may point to locations of input tensors 222(3) and 222(4) and/or additional input tensors at each additional encoder layer. Additional indirection buffers may also be used at each encoder layer to point to other types of tensors or input data.

In some examples, a decoder layer in set of decoder layers 410 may decode a frame of the set of frames, may save a state of the decoded frame, and may save a partial output as a state of a subsequent decoder layer for a subsequent frame occurring chronologically after the frame. For example, a decoder may use transposed convolutions. As shown in FIG.

7, an exemplary decoding process may, using data from the encoding process, save partial outputs at each decoder layer as states for subsequent layers. In this example, decoder layer 412(1) may save a state of frame 216(1) and a partial output 702(1) that feeds into a decoder layer 412(2). In this example, decoder layer 412(2) may then use partial output 702(1) to process a state of frame 216(2) and save a partial output 702(2) for decoder layer 412(3). Similarly, decoder layer 412(3) may use partial output 702(2) to process a state of frame 216(3) and save a partial output 702(3), and so on. In some examples, partial outputs 702(1)-(3) may provide context for streaming audio where subsequent frames are not yet available. In these examples, the processing of the subsequent frames may be faster and more accurate when using the previously saved context.

In one example, trained neural network model 220 may be used to detect speech. In this example, frames before and/or after a current frame may help determine what words are spoken during the current frame. Thus, by saving outputs and partial outputs at each encoder layer and each decoder layer, trained neural network model 220 may use previous frames to detect what is in current frames at each layer. In other examples, such as for recorded media clip 212 stored in a saved file, encoder layers and decoder layers may additionally use contextual data from subsequent frames to improve processing of each current frame. In these examples, trained neural network model 220 may have relaxed latency requirements and may enable processing of wideband audio with more audio context.

In some embodiments, the disclosed systems and methods may further include improving trained neural network model 220 by combining a gating mechanism and a normalization process to process an output of an encoder layer of set of encoder layers 402 to create an input of a next encoder layer. Additionally or alternatively, the disclosed systems and methods may combine the gating mechanism and the normalization process to process an output of a decoder layer of set of decoder layers 410 to create an input of a next decoder layer. In some examples, the term "gating mechanism" may refer to a neural network technique to pass data and information forward and to store data to update current states. In some examples, the term "normalization" may refer to a method to adjust the values of input data to conform to a common scale. For example, frames of audio data may be resampled to a range of frequencies and/or normalized to a volume range. The frames of audio data may then be processed and passed from one encoder layer to the next and/or from one decoder layer to the next to update the states of encoder and decoder layers, such as by using gated linear unit (GLU) layers and separate normalization layers. In this example, by fusing the GLU and normalization layers, the frames of audio data may be normalized while being passed to subsequent encoder or decoder layers to reduce the processing time of performing these steps separately. Additionally, the disclosed systems and methods may vectorize existing operators to streamline data processing. For example, trained neural network model 220 may take input audio from media clip 212, normalize the audio, output the processed and normalized audio, and reverse the normalization of the output.

In some embodiments, the disclosed systems and methods may quantize one or more of linear layers 408(1)-(N) of feature processor 406 and/or combine operations to combine outputs of linear layers 408(1)-(N) of feature processor 406. For example, linear layers of a GRU type of feature processor may be dynamically quantized to reduce the complexity of the data processed by feature processor 406 and/or to reduce the complexity of feature processor 406 itself. As another example, by combining the outputs of linear layers 408(1)-(N), the disclosed systems and methods may avoid materialization of intermediate output tensors, which reduces computing time and complexity.

To further reduce computing and processor usage, trained neural network model 220 may also use internal state management, simplify multiple layers of trained neural network model 220, simplify embedding management, quantize GRUs in trained neural network model 220, combine operations that combine the output of linear layers 408(1)-(N), and/or perform various other methods to streamline trained neural network model 220. For example, by vectorizing some operations of trained neural network model 220, the disclosed systems and methods may improve the speed of the operations. In some examples, the disclosed systems and methods may additionally include steps to perform acoustic echo cancellation and/or acoustic echo suppression to specifically reduce noise produced by echo recorded by sensors or microphones. In some examples, trained neural network model 220 may avoid or replace costly convolution processes and/or modify convolutions to accept multiple inputs. In some examples, using quantization in trained neural network model 220 may reduce overhead and latency in comparison to static quantization operations and may adjust to different input data. In some examples, trained neural network model 220 may balance the complexity of quantized data with the quality of audio processing to determine an optimal degree of quantization.

In some embodiments, performance module 208 may perform noise suppression process 218 by identifying a signal of interest, detecting the signal of interest in one or more frames of set of frames 214 using trained neural network model 220, and filtering one or more other signals from the one or more frames of set of frames 214. In these embodiments, performance module 208 may detect the signal of interest by extracting a set of parameters from trained neural network model 220 to perform just-in-time compilation and deployment of noise suppression process 218. For example, performance module 208 may determine that speech is a signal of interest, detect speech in live streaming audio of media clip 212, and extract parameters that identify speech to perform just-in-time filtering of background noise from media clip 212 while media clip 212 is streaming. By performing state management internally, trained neural network model 220 may avoid passing states back and forth, and operations to forward states may assume states are valid.

Figure 8:
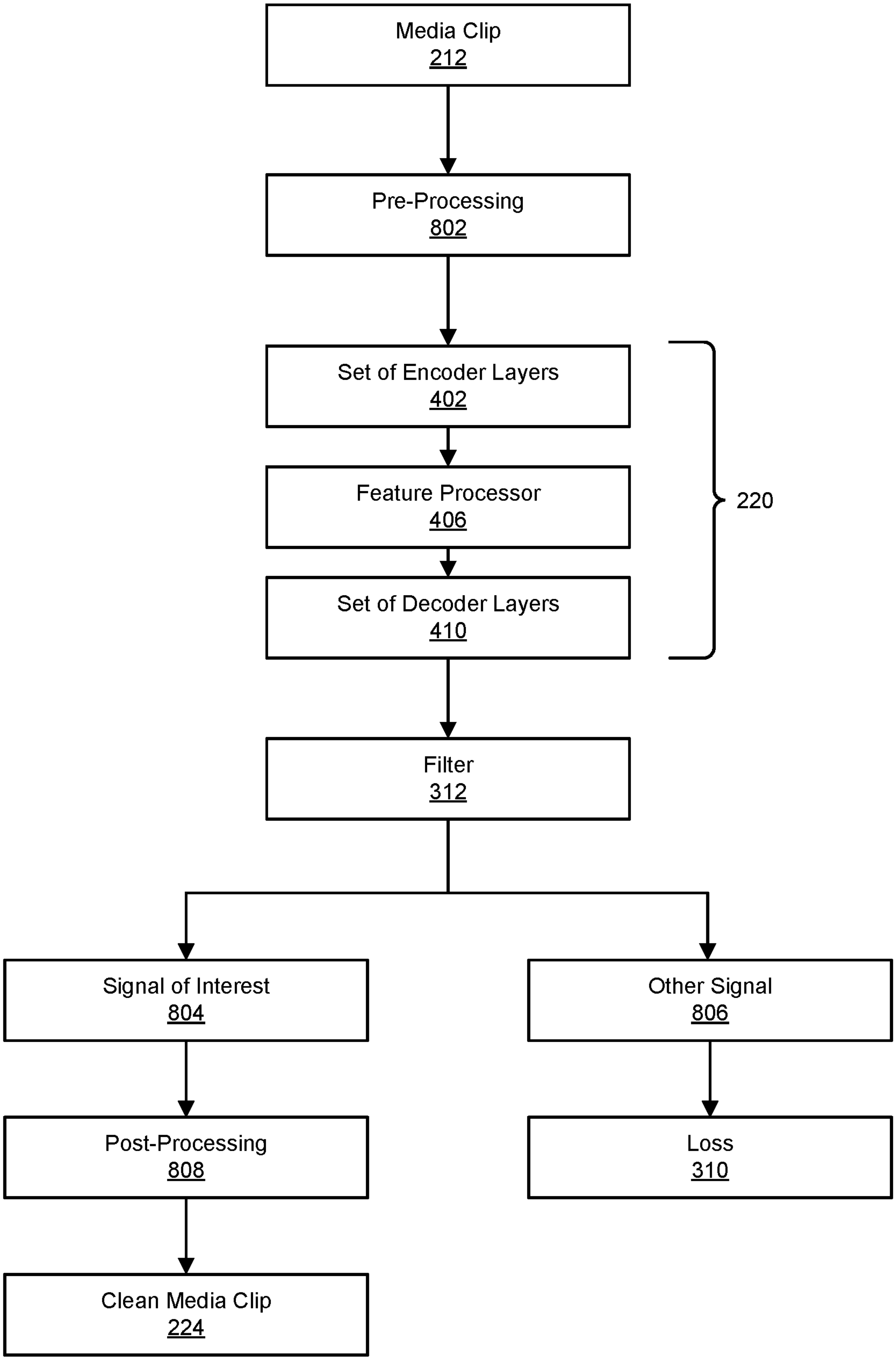
FIG. 8 is a block diagram of an exemplary noise suppression process using an exemplary trained neural network model to create an exemplary clean media clip.

FIG. 8 illustrates noise suppression process 218 using trained neural network model 220 to create filter 312, which may then be used to separate a signal of interest 804 from another signal 806, which may represent unwanted noise. As shown in FIG. 8, noise suppression process 218 may include additional steps, such as pre-processing 802 to initially process the audio data of media clip 212 and/or post-processing 808 to finalize a clean media clip 224. In some examples, pre-processing 802 may include normalization of audio data, data augmentation, operations to add a phase shift to the audio data, and/or any other appropriate processes to prepare the audio data as input to trained neural network model 220. In alternate examples, pre-processing 802 and post-processing 808 may include multiple steps and/or may be performed in a different order during noise suppression process 218, such as applying filter 312 as part of post-processing 808. In the example of FIG. 8, clean media clip 224 may include only signal of interest 804. In other examples, clean media clip 224 may include a combination of signal of interest 804, other signal 806, and/or additional signals, such as background noise at a quieter volume. In the example of FIG. 3, machine learning method 302 may learn from multiple losses 310(1)-(3), and trained neural network model 220 of FIG. 8 may compute a loss 310 with reconstructed clean media clip 224 in comparison to original media clip 212. For example, other signal 806 may indicate loss 310 between clean media clip 224 and media clip 212. In other examples, loss 310 may be calculated from a combination of signal of interest 804, other signal 806, and/or additional signals.

Returning to FIG. 1, at step 140, one or more of the systems described herein may create, by the computing device, a clean media clip based on the noise suppression process. For example, a creation module 210 may, as part of computing device 202 in FIG. 2, create clean media clip 224 based on noise suppression process 218.

The systems described herein may perform step 140 in a variety of ways. In one embodiment, creation module 210 may process the output of trained neural network model 220 to create clean media clip 224 by combining individual processed frames of set of frames 214. For example, trained neural network model 220 may process one frame at a time, and clean media clip 224 may represent a combination of the processed frames reconstituted into a single media clip. In some examples, the term "clean media clip" may refer to a media clip that has been processed or enhanced, such as by trained neural network model 220. For example, trained neural network model 220 may be trained to reduce artifacts in processed speech, and clean media clip 224 may represent a version of media clip 212 with enhanced quality of speech for clarity to a listener, such as the example of FIG. 8. In another example, trained neural network model 220 may be trained to suppress speech, and clean media clip 224 may represent a version of media clip 212 with speech removed or suppressed to enable speech dubbing in conjunction with a different media clip.

Figure 9:
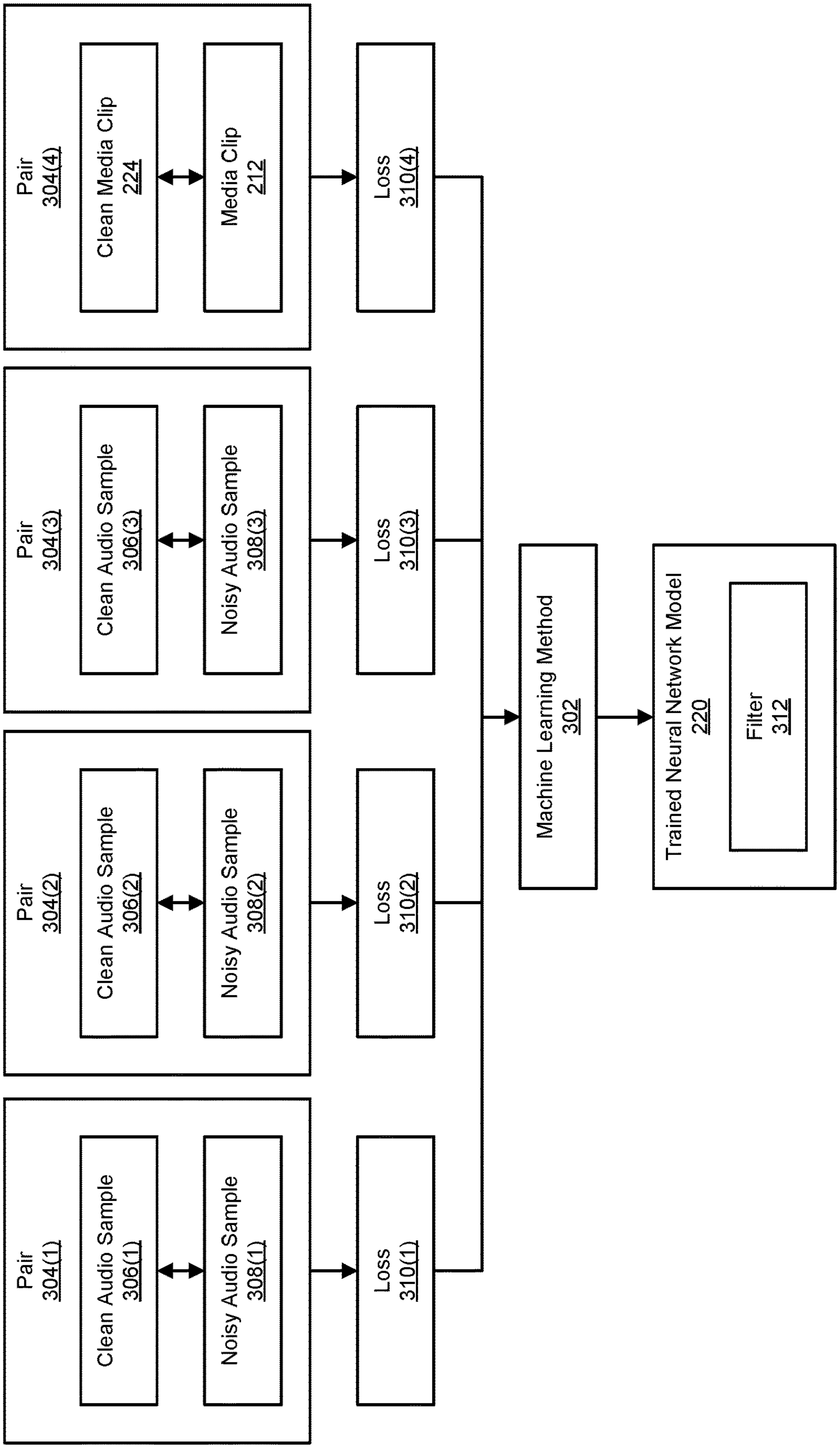
FIG. 9 is a block diagram of an exemplary iterative improvement of an exemplary trained neural network model through retraining.

In some embodiments, the systems and methods disclosed herein may further include iteratively improving trained neural network model 220 by retraining trained neural network model 220 with media clip 212 and clean media clip 224. For example, as illustrated in FIG. 9, an additional pair 304(4) may be used to calculate an additional loss 310(4), which may represent loss 310 of FIG. 8. By retraining trained neural network model 220, the disclosed systems and methods may continue to improve noise suppression process 218 with new audio samples for faster and more accurate audio processing.

As explained above in connection with method 100 in FIG. 1, the disclosed systems and methods may, by incorporating various optimization methods to improve a neural network model, perform noise suppression quickly and efficiently, particularly for live streaming audio. Specifically, the disclosed systems and methods may first use pairs of clean and noisy audio samples to train a neural network model to create a mask or filter and to determine a loss compared to clean audio. The disclosed systems and methods may then divide a media clip, such as an audio clip, into short timeframes to enable processing of live streaming audio as each divided frame is received or produced. The neural network model may include encoder layers, decoder layers, and a feature processor to process individual frames and use the outputs to improve processing of subsequent frames. The disclosed systems and methods may also streamline the neural network model, such as by using indirection pointers to avoid concatenating inputs to each encoder layer. The systems and methods described herein may subsequently enhance a signal of interest based on the neural network model and suppress other signals. Additionally, the systems and methods described herein may combine the processed frames to create a clean media clip or may send each processed frame immediately to create cleaned live streaming audio. Furthermore, the disclosed systems and methods may iteratively improve the neural network by feeding the clean media clip and original clip back to a machine learning method used to train the model.

By simplifying and combining operations such as convolutions and concatenation and by quantizing input data, the disclosed systems and methods may enable complex models that reduce runtime complexity and latency without compromising audio quality. Additionally, by enabling the model to quickly process a frame and using contextual information from a previous frame more efficiently, the disclosed systems and methods may reduce latency and decrease processor use to enable real-time noise suppression of live streaming audio. Thus, the systems and methods described herein may improve noise suppression and the processing of audio data to remove environmental distractions and artifacts.

Example 1: A computer-implemented method for noise suppression may include 1) capturing, by a computing device, a media clip, 2) dividing, by the computing device, the media clip into a set of frames, wherein each frame may include an audio portion of the media clip of a predetermined length of time, 3) performing, by the computing device, a noise suppression process on each frame of the set of frames using a trained neural network model, wherein the trained neural network model is quantized to use input tensors, and 4) creating, by the computing device, a clean media clip based on the noise suppression process.

Example 2: The computer-implemented method of Example 1, wherein the media clip may include one or more of an audio clip, a video clip, and/or a multimedia clip.

Example 3: The computer-implemented method of any of Examples 1 and 2, wherein the trained neural network model may be trained using a machine learning method on pairs of clean audio samples and noisy audio samples to create a filter for noisy audio and/or to produce clean audio directly from noisy audio.

Example 4: The computer-implemented method of Example 3, wherein the noisy audio samples may include one or more noisy audio clips and/or clean audio clips transformed into noisy audio clips using data augmentation.

Example 5: The computer-implemented method of any of Examples 3 and 4, wherein the trained neural network model may be trained by comparing the noisy audio samples to the clean audio samples to determine a set of losses.

Example 6: The computer-implemented method of any of Examples 1-5, wherein the trained neural network model may include one or more of a set of encoder layers, a feature processor, and/or a set of decoder layers.

Example 7: The computer-implemented method of Example 6, wherein the trained neural network model may be quantized by using indirection buffers to point to separate input tensor locations during encoding.

Example 8: The computer-implemented method of Example 7, wherein an encoder layer in the set of encoder layers may save a state of a frame as a first input tensor of the frame, may save an output of a previous encoder layer for a previous frame occurring chronologically before the frame as a second input tensor of the frame, may use the indirection buffers to identify a location of the first input tensor and a location of the second input tensor, and may output an encoding of the frame using the first input tensor and the second input tensor.

Example 9: The computer-implemented method of any of Examples 6-8, wherein a decoder layer in the set of decoder layers may decode a frame of the set of frames, may save a state of the decoded frame, and may save a partial output as a state of a subsequent decoder layer for a subsequent frame occurring chronologically after the frame.

Example 10: The computer-implemented method of any of Examples 6-9 may further include improving the trained neural network model by one or more of the following: combining a gating mechanism and a normalization process to process an output of an encoder layer of the set of encoder layers to create an input of a next encoder layer, quantizing one or more linear layers of the feature processor, combining operations to combine outputs of linear layers of the feature processor, and/or combining the gating mechanism and the normalization process to process an output of a decoder layer of the set of decoder layers to create an input of a next decoder layer.

Example 11: The computer-implemented method of any of Examples 1-10, wherein performing the noise suppression process may include identifying a signal of interest, detecting the signal of interest in one or more frames of the set of frames using the trained neural network model, and filtering one or more other signals from the one or more frames of the set of frames.

Example 12: The computer-implemented method of Example 11, wherein detecting the signal of interest in the one or more frames of the set of frames may include extracting a set of parameters from the trained neural network model to perform just-in-time compilation and deployment of the noise suppression process.

Example 13: The computer-implemented method of any of Examples 1-12 may further include iteratively improving the trained neural network model by retraining the trained neural network model with the media clip and the clean media clip.

Example 14: A corresponding system for noise suppression may include several modules stored in memory, including 1) a capture module that captures, by a computing device, a media clip, 2) a division module that divides, by the computing device, the media clip into a set of frames, wherein each frame may include an audio portion of the media clip of a predetermined length of time, 3) a performance module that performs, by the computing device, a noise suppression process on each frame of the set of frames using a trained neural network model, wherein the trained neural network model is quantized to use input tensors, and 4) a creation module that creates, by the computing device, a clean media clip based on the noise suppression process. The system may also include one or more hardware processors that execute the capture module, the division module, the performance module, and the creation module.

Example 15: The system of Example 14, wherein the trained neural network model may be trained using a machine learning method on pairs of clean audio samples and noisy audio samples to create a filter for noisy audio and/or to produce clean audio directly from noisy audio.

Example 16: The system of any of Examples 14 and 15, wherein the trained neural network model may include one or more of a set of encoder layers, a feature processor, and/or a set of decoder layers.

Example 17: The system of Example 16, wherein the trained neural network model may be quantized by using indirection buffers to point to separate input tensor locations during encoding.

Example 18: The system of Example 17, wherein an encoder layer in the set of encoder layers may save a state of a frame as a first input tensor of the frame, may save an output of a previous encoder layer for a previous frame occurring chronologically before the frame as a second input tensor of the frame, may use the indirection buffers to identify a location of the first input tensor and a location of the second input tensor, and may output an encoding of the frame using the first input tensor and the second input tensor.

Example 19: The system of any of Example 16-18, wherein a decoder layer in the set of decoder layers may decode a frame of the set of frames, may save a state of the decoded frame, and may save a partial output as a state of a subsequent decoder layer for a subsequent frame occurring chronologically after the frame.

Example 20: The above-described method may be encoded as computer-readable instructions on a computer-readable medium. For example, a non-transitory computer-readable medium may include one or more computer-executable instructions that, when executed by one or more processors of a computing device, may cause the computing device to 1) capture a media clip, 2) divide the media clip into a set of frames, wherein each frame may include an audio portion of the media clip of a predetermined length of time, 3) perform a noise suppression process on each frame of the set of frames using a trained neural network model, wherein the trained neural network model is quantized to use input tensors, and 4) create a clean media clip based on the noise suppression process.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive an audio clip to be transformed, transform the audio clip into short frames of audio, output a result of the transformation to suppress noise in each frame, use the result of the transformation to create a clean audio clip, and store the result of the transformation to iteratively improve a noise suppression process. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

capturing, by a computing device, a media clip;

dividing, by the computing device, the media clip into a set of frames, wherein each frame comprises an audio portion of the media clip of a predetermined length of time;

performing, by the computing device, a noise suppression process on each frame of the set of frames using a trained neural network model, wherein the predetermined length of time for each frame is based at least in part on a duration of the noise suppression process such that the noise suppression process for each frame is able to be completed within the predetermined length of time, and wherein the trained neural network model is quantized to use input tensors by using indirection buffers to point to separate input tensor locations; and creating, by the computing device, a clean media clip based on the noise suppression process.

2. The method of claim 1, wherein the media clip comprises at least one of:

an audio clip;

a video clip; or a multimedia clip.

3. The method of claim 1, wherein the trained neural network model is trained using a machine learning method on pairs of clean audio samples and noisy audio samples to perform at least one of:

creating a filter for noisy audio; or producing clean audio directly from noisy audio.

4. The method of claim 3, wherein the noisy audio samples comprise at least one of:

noisy audio clips; or clean audio clips transformed into noisy audio clips using data augmentation.

5. The method of claim 3, wherein the trained neural network model is trained by comparing the noisy audio samples to the clean audio samples to determine a set of losses.

6. The method of claim 1, wherein the trained neural network model comprises at least one of:

a set of encoder layers;

a feature processor; or a set of decoder layers.

7. The method of claim 6, wherein the trained neural network model uses the indirection buffers during encoding.

8. The method of claim 7, wherein an encoder layer in the set of encoder layers:

saves a state of a frame as a first input tensor of the frame;

saves an output of a previous encoder layer for a previous frame occurring chronologically before the frame as a second input tensor of the frame;

uses the indirection buffers to identify a location of the first input tensor and a location of the second input tensor; and outputs an encoding of the frame using the first input tensor and the second input tensor.

9. The method of claim 6, wherein a decoder layer in the set of decoder layers:

decodes a frame of the set of frames;

saves a state of the decoded frame; and saves a partial output as a state of a subsequent decoder layer for a subsequent frame occurring chronologically after the frame.

10. The method of claim 6, further comprising improving the trained neural network model by at least one of:

combining a gating mechanism and a normalization process to process an output of an encoder layer of the set of encoder layers to create an input of a next encoder layer;

quantizing at least one linear layer of the feature processor;

combining operations to combine outputs of linear layers of the feature processor; or combining the gating mechanism and the normalization process to process an output of a decoder layer of the set of decoder layers to create an input of a next decoder layer.

11. The method of claim 1, wherein performing the noise suppression process comprises:

identifying a signal of interest;

detecting the signal of interest in at least one frame of the set of frames using the trained neural network model; and filtering at least one other signal from the at least one frame of the set of frames.

12. The method of claim 11, wherein detecting the signal of interest in the at least one frame of the set of frames comprises extracting a set of parameters from the trained neural network model to perform just-in-time compilation and deployment of the noise suppression process.

13. The method of claim 1, further comprising iteratively improving the trained neural network model by retraining the trained neural network model with the media clip and the clean media clip.

14. A system comprising:

a capture module, stored in memory, that captures, by a computing device, a media clip;

a division module, stored in memory, that divides, by the computing device, the media clip into a set of frames, wherein each frame comprises an audio portion of the media clip of a predetermined length of time;

a performance module, stored in memory, that performs, by the computing device, a noise suppression process on each frame of the set of frames using a trained neural network model, wherein the predetermined length of time for each frame is based at least in part on a duration of the noise suppression process such that the noise suppression process for each frame is able to be completed within the predetermined length of time, and wherein the trained neural network model is quantized to use input tensors by using indirection buffers to point to separate input tensor locations;

a creation module, stored in memory, that creates, by the computing device, a clean media clip based on the noise suppression process; and at least one processor that executes the capture module, the division module, the performance module, and the creation module.

15. The system of claim 14, wherein the trained neural network model is trained using a machine learning method on pairs of clean audio samples and noisy audio samples to perform at least one of:

creating a filter for noisy audio; or producing clean audio directly from noisy audio.

16. The system of claim 14, wherein the trained neural network model comprises at least one of:

a set of encoder layers;

a feature processor; or a set of decoder layers.

17. The system of claim 16, wherein the trained neural network model uses the indirection buffers during encoding.

18. The system of claim 17, wherein an encoder layer in the set of encoder layers:

saves a state of a frame as a first input tensor of the frame;

saves an output of a previous encoder layer for a previous frame occurring chronologically before the frame as a second input tensor of the frame;

uses the indirection buffers to identify a location of the first input tensor and a location of the second input tensor; and outputs an encoding of the frame using the first input tensor and the second input tensor.

19. The system of claim 16, wherein a decoder layer in the set of decoder layers:

decodes a frame of the set of frames;

saves a state of the decoded frame; and saves a partial output as a state of a subsequent decoder layer for a subsequent frame occurring chronologically after the frame.

20. A non-transitory computer-readable medium comprising one or more computer-executable instructions that, when executed by at least one processor of a computing device, cause the computing device to:

capture a media clip;

divide the media clip into a set of frames, wherein each frame comprises an audio portion of the media clip of a predetermined length of time;

perform a noise suppression process on each frame of the set of frames using a trained neural network model, wherein the predetermined length of time for each frame is based at least in part on a duration of the noise suppression process such that the noise suppression process for each frame is able to be completed within the predetermined length of time, and wherein the trained neural network model is quantized to use input tensors, by using indirection buffers to point to separate input tensor locations; and create a clean media clip based on the noise suppression process.

* * * * *